(12) United States Patent
Mallick et al.

(10) Patent No.: US 11,934,659 B1
(45) Date of Patent: Mar. 19, 2024

(54) HOST BACKGROUND COPY PROCESS WITH RATE ADJUSTMENT UTILIZING INPUT-OUTPUT PROCESSING PRESSURE FEEDBACK FROM STORAGE SYSTEM

(71) Applicant: Dell Products L.P., Round Rock, TX (US)

(72) Inventors: Sanjib Mallick, Bangalore (IN); Vinay G. Rao, Bangalore (IN); Arieh Don, Newton, MA (US)

(73) Assignee: Dell Products L.P., Round Rock, TX (US)

( * ) Notice: Subject to any disclaimer, the term of this patent is extended or adjusted under 35 U.S.C. 154(b) by 2 days.

(21) Appl. No.: 17/954,660

(22) Filed: Sep. 28, 2022

(51) Int. Cl.
*G06F 3/06* (2006.01)

(52) U.S. Cl.
CPC .......... *G06F 3/0613* (2013.01); *G06F 3/0644* (2013.01); *G06F 3/0683* (2013.01)

(58) Field of Classification Search
CPC ..... G06F 3/0613; G06F 3/0644; G06F 3/0683
See application file for complete search history.

(56) References Cited

U.S. PATENT DOCUMENTS

| | | | |
|---|---|---|---|
| 6,567,397 | B1 | 5/2003 | Campana, Jr. et al. |
| 6,687,746 | B1 | 2/2004 | Shuster et al. |
| 6,697,875 | B1 | 2/2004 | Wilson |
| 7,275,103 | B1 | 9/2007 | Thrasher et al. |
| 7,454,437 | B1 | 11/2008 | Lavallee et al. |
| 7,617,292 | B2 | 11/2009 | Moore et al. |
| 7,668,981 | B1 | 2/2010 | Nagineni et al. |
| 7,770,053 | B1 | 8/2010 | Bappe et al. |
| 7,809,912 | B1 | 10/2010 | Raizen et al. |
| 7,818,428 | B1 | 10/2010 | Lavallee et al. |

(Continued)

FOREIGN PATENT DOCUMENTS

| | | |
|---|---|---|
| CN | 103677927 B | 2/2017 |
| EP | 1117028 A2 | 7/2001 |
| EP | 2667569 A1 | 11/2013 |

OTHER PUBLICATIONS

International Search Report and Written Opinion of PCT/US2019/052549 dated Dec. 4, 2019, 13 pages.

(Continued)

*Primary Examiner* — Gurtej Bansal
(74) *Attorney, Agent, or Firm* — Ryan, Mason & Lewis, LLP

(57) ABSTRACT

A processing device illustratively includes a processor coupled to a memory, and is configured to initiate a background copy process in a host device to copy data from a first storage system to a second storage system. The processing device receives input-output (IO) processing pressure feedback from at least one of the first and second storage systems, and adjusts one or more characteristics of the background copy process based at least in part on the received IO processing pressure feedback. The processing device may comprise, for example, host level mirroring (HLM) logic configured to control execution of the background copy process for one or more logical storage devices. Adjusting one or more characteristics of the background copy process based at least in part on the received IO processing pressure feedback may comprise, for example, reducing a rate of the background copy process responsive to the received IO processing pressure feedback.

20 Claims, 4 Drawing Sheets

(56) References Cited

U.S. PATENT DOCUMENTS

| | | |
|---|---|---|
| 7,890,664 B1 | 2/2011 | Tao et al. |
| 7,904,681 B1 | 3/2011 | Bappe et al. |
| 7,925,872 B2 | 4/2011 | Lai et al. |
| 8,250,256 B2 | 8/2012 | Ghosalkar et al. |
| 8,285,825 B1 | 10/2012 | Nagaraj et al. |
| 8,417,817 B1 | 4/2013 | Jacobs |
| 8,732,342 B1 | 5/2014 | Clark et al. |
| 8,825,919 B1 | 9/2014 | Lim et al. |
| 8,832,334 B2 | 9/2014 | Okita |
| 8,874,746 B1 | 10/2014 | Gonzalez |
| 9,026,694 B1 | 5/2015 | Davidson et al. |
| 9,122,503 B1 | 9/2015 | Hoff |
| 9,201,803 B1 | 12/2015 | Derbeko et al. |
| 9,400,611 B1 | 7/2016 | Raizen |
| 9,417,907 B1 | 8/2016 | Dire et al. |
| 9,430,368 B1 | 8/2016 | Derbeko et al. |
| 9,594,780 B1 | 3/2017 | Esposito et al. |
| 9,647,933 B1 | 5/2017 | Tawri et al. |
| 9,672,160 B1 | 6/2017 | Derbeko et al. |
| 9,778,852 B1 | 10/2017 | Marshak et al. |
| 9,798,629 B1* | 10/2017 | Shilane ............ G06F 11/1466 |
| 10,228,868 B1 | 3/2019 | Liang et al. |
| 10,254,970 B1 | 4/2019 | Martin et al. |
| 10,270,794 B1 | 4/2019 | Mukerji et al. |
| 10,289,325 B1 | 5/2019 | Bono |
| 10,346,076 B1 | 7/2019 | Jonnala et al. |
| 10,353,714 B1 | 7/2019 | Gokam et al. |
| 10,439,878 B1 | 10/2019 | Tah et al. |
| 10,474,367 B1 | 11/2019 | Mallick et al. |
| 10,474,383 B1 | 11/2019 | Wang et al. |
| 10,476,960 B1 | 11/2019 | Rao et al. |
| 10,496,282 B1 | 12/2019 | Martin et al. |
| 10,521,369 B1 | 12/2019 | Mallick et al. |
| 10,606,496 B1 | 3/2020 | Mallick et al. |
| 10,637,917 B2 | 4/2020 | Mallick et al. |
| 10,652,206 B1 | 5/2020 | Pusalkar et al. |
| 10,659,371 B1 | 5/2020 | Jain et al. |
| 10,728,166 B2 | 7/2020 | Balakrishnan et al. |
| 10,754,572 B2 | 8/2020 | Kumar et al. |
| 10,757,189 B2 | 8/2020 | Mallick et al. |
| 10,764,371 B2 | 9/2020 | Rao et al. |
| 10,789,006 B1 | 9/2020 | Gokam et al. |
| 10,817,181 B2 | 10/2020 | Mallick et al. |
| 10,831,387 B1 | 11/2020 | Venkatesan et al. |
| 10,838,648 B2 | 11/2020 | Sharma et al. |
| 10,880,217 B2 | 12/2020 | Mallick et al. |
| 10,884,935 B1 | 1/2021 | Doddaiah |
| 10,911,402 B2 | 2/2021 | Pusalkar et al. |
| 10,936,220 B2 | 3/2021 | Mallick et al. |
| 10,949,104 B2 | 3/2021 | Marappan et al. |
| 10,996,879 B2 | 5/2021 | Gokam |
| 11,012,512 B1 | 5/2021 | Mallick et al. |
| 11,016,699 B2 | 5/2021 | Anchi et al. |
| 11,016,783 B2 | 5/2021 | Rao et al. |
| 11,093,155 B2 | 8/2021 | Anchi et al. |
| 11,106,381 B2 | 8/2021 | Rao et al. |
| 11,126,363 B2 | 9/2021 | Tidke et al. |
| 11,157,203 B2 | 10/2021 | Gokam et al. |
| 11,366,771 B2 | 6/2022 | Smith et al. |
| 11,397,540 B2 | 7/2022 | Mallick et al. |
| 2002/0023151 A1 | 2/2002 | Iwatani |
| 2002/0103923 A1 | 8/2002 | Cherian et al. |
| 2004/0010563 A1 | 1/2004 | Forte et al. |
| 2006/0026346 A1 | 2/2006 | Kadoiri et al. |
| 2006/0277383 A1 | 12/2006 | Hayden et al. |
| 2007/0174849 A1 | 7/2007 | Cheung et al. |
| 2008/0043973 A1 | 2/2008 | Lai et al. |
| 2008/0201458 A1 | 8/2008 | Salli |
| 2008/0301332 A1 | 12/2008 | Butler et al. |
| 2009/0248917 A1 | 10/2009 | Kalos et al. |
| 2009/0259749 A1 | 10/2009 | Barrett et al. |
| 2010/0313063 A1 | 12/2010 | Venkataraja et al. |
| 2011/0197027 A1 | 8/2011 | Balasubramanian et al. |
| 2011/0296230 A1 | 12/2011 | Chen et al. |
| 2012/0102369 A1 | 4/2012 | Hiltunen et al. |
| 2012/0246345 A1 | 9/2012 | Contreras et al. |
| 2013/0117766 A1 | 5/2013 | Bax et al. |
| 2013/0311729 A1 | 11/2013 | Navarro et al. |
| 2013/0339551 A1 | 12/2013 | Flanagan et al. |
| 2014/0105068 A1 | 4/2014 | Xu |
| 2014/0185157 A1* | 7/2014 | Kulkarni ............ G06F 3/0688 711/112 |
| 2015/0067271 A1 | 3/2015 | Camp et al. |
| 2015/0222705 A1 | 8/2015 | Stephens |
| 2015/0242134 A1 | 8/2015 | Takada et al. |
| 2015/0326481 A1* | 11/2015 | Rector ............ H04W 72/56 370/236 |
| 2016/0092136 A1 | 3/2016 | Balakrishnan et al. |
| 2016/0117113 A1 | 4/2016 | Li et al. |
| 2016/0313944 A1 | 10/2016 | Hodgdon et al. |
| 2016/0335003 A1 | 11/2016 | Ahmed et al. |
| 2016/0378349 A1 | 12/2016 | Wigmore et al. |
| 2017/0235507 A1 | 8/2017 | Sinha et al. |
| 2017/0317991 A1 | 11/2017 | Lionetti |
| 2018/0046552 A1 | 2/2018 | Madhavarapu et al. |
| 2018/0121366 A1 | 5/2018 | Tian |
| 2018/0173464 A1 | 6/2018 | Wongso et al. |
| 2018/0189635 A1 | 7/2018 | Olarig et al. |
| 2018/0210664 A1 | 7/2018 | Weissbrem |
| 2018/0253256 A1 | 9/2018 | Bharadwaj |
| 2018/0284997 A1 | 10/2018 | Dalmatov |
| 2018/0285159 A1* | 10/2018 | Shen ............ G06F 3/0635 |
| 2018/0288155 A1 | 10/2018 | Zhou et al. |
| 2018/0317101 A1 | 11/2018 | Koue |
| 2019/0095299 A1 | 3/2019 | Liu et al. |
| 2019/0104015 A1 | 4/2019 | Moore et al. |
| 2019/0108888 A1 | 4/2019 | Sarkar et al. |
| 2019/0205203 A1 | 7/2019 | Hwang et al. |
| 2019/0207873 A1 | 7/2019 | Kasheff et al. |
| 2019/0303308 A1 | 10/2019 | Knauft et al. |
| 2019/0334987 A1 | 10/2019 | Mallick et al. |
| 2020/0021653 A1 | 1/2020 | Rao et al. |
| 2020/0036604 A1 | 1/2020 | Kalman et al. |
| 2020/0045131 A1 | 2/2020 | Nigam et al. |
| 2020/0097203 A1 | 3/2020 | Mallick et al. |
| 2020/0106698 A1 | 4/2020 | Rao et al. |
| 2020/0110552 A1 | 4/2020 | Kumar et al. |
| 2020/0112608 A1 | 4/2020 | Patel et al. |
| 2020/0192588 A1 | 6/2020 | Kumar et al. |
| 2020/0204475 A1 | 6/2020 | Mallick et al. |
| 2020/0204495 A1 | 6/2020 | Mallick et al. |
| 2020/0213274 A1 | 7/2020 | Pusalkar et al. |
| 2020/0241890 A1 | 7/2020 | Mallick et al. |
| 2020/0314218 A1 | 10/2020 | Kumar et al. |
| 2020/0348860 A1 | 11/2020 | Mallick et al. |
| 2020/0348861 A1 | 11/2020 | Marappan et al. |
| 2020/0348863 A1 | 11/2020 | Venkatesan et al. |
| 2020/0348869 A1 | 11/2020 | Gokam |
| 2020/0349094 A1 | 11/2020 | Smith et al. |
| 2020/0363985 A1 | 11/2020 | Gokam et al. |
| 2020/0372401 A1 | 11/2020 | Mallick et al. |
| 2021/0019054 A1 | 1/2021 | Anchi et al. |
| 2021/0026551 A1 | 1/2021 | Tidke et al. |
| 2021/0026650 A1 | 1/2021 | Rao et al. |
| 2021/0157502 A1 | 5/2021 | Rao et al. |
| 2021/0181965 A1 | 6/2021 | Anchi et al. |

OTHER PUBLICATIONS

International Search Report and Written Opinion of PCT/US2019/053204 dated Dec. 16, 2019, 40 pages.

International Search Report and Written Opinion of PCT/US2019/053473 dated Dec. 19, 2019, 16 pages.

International Search Report and Written Opinion of PCT/US2019/067144 dated May 4, 2020, 26 pages.

Kris Piepho, "Dell EMC SC Series Storage: Microsoft Multipath I/O," Dell EMC Best Practices, Jan. 2017, 57 pages.

NVM Express, "NVM Express, Revision 1.3," NVM Express, May 1, 2017, 282 pages.

Vmware, "Multipathing Configuration for Software iSCSI Using Port Binding," Technical White Paper, Apr. 25, 2012, 15 pages.

Dell EMC, "Dell EMC SC Series Storage: Microsoft Multipath I/O," Dell EMC Engineering, Jun. 2017, 56 pages.

(56) References Cited

OTHER PUBLICATIONS

Dell EMC, "Dell EMC PowerPath Family: PowerPath and PowerPath/VE Multipathing," Data Sheet, 2017, 3 pages.
EMC, "EMC PowerPath and PowerPath/VE Family for Windows," Installation and Administration Guide, Oct. 2018, 102 pages.
EMC, "EMC Powerpath Load Balancing and Failover", Comparison with native MPIO operating system solutions, Feb. 2011, 28 pages.
Dell EMC, "PowerMax OS," Dell EMC PowerMax Family Product Guide, May 2019, 192 pages.
Dell EMC, "Dell EMC SC Series Storage and Microsoft Multipath I/O," CML 1004, Jul. 2018, 36 pages.
Vmware, Inc. "VMware VMFS Volume Management," 2009, 8 pages.
Dell EMC, "Dell EMC Unity: Virtualization Integration," Technical White Paper, Oct. 2019, 39 pages.
Dell EMC, "Dell EMC PowerMax: ISCSI Implementation for Dell EMC Storage Arrays Running PowerMaxOS," Technical White Paper, Sep. 2019, 35 pages.
NVM Express, "NVM Express Base Specification, Revision 2.0a," NVM Express, Jul. 23, 2021, 454 pages.
NVM Express, "NVM Express Base Specification, Revision 2.0b," NVM Express, Jan. 6, 2022, 455 pages.
U.S. Appl. No. 17/326,452, filed in the name of Sanjib Mallick et al. on May 21, 2021, and entitled "Write Pressure Throttling Based on Service Level Objectives."

* cited by examiner

HOST BACKGROUND COPY PROCESS WITH RATE ADJUSTMENT UTILIZING INPUT-OUTPUT PROCESSING PRESSURE FEEDBACK FROM STORAGE SYSTEM

FIELD

The field relates generally to information processing systems, and more particularly to storage in information processing systems.

BACKGROUND

Storage arrays and other types of storage systems are often shared by multiple host devices over a network. Applications running on the host devices each include one or more processes that perform the application functionality. The processes issue input-output (IO) operations directed to particular logical storage volumes or other logical storage devices, for delivery by the host devices over selected paths to storage ports of the storage system. Different ones of the host devices can run different applications with varying workloads and associated IO patterns. Such host devices also generate additional IO operations in performing various data services such as migration and replication. Various types of storage access protocols can be used by host devices to access the logical storage volumes or other logical storage devices of the storage system, including by way of example Small Computer System Interface (SCSI) access protocols and Non-Volatile Memory Express (NVMe) access protocols.

SUMMARY

Illustrative embodiments provide techniques for controlling a host background copy process based at least in part on IO processing pressure feedback from at least one storage array or other storage system. For example, some embodiments configure a host device, implementing a background copy process to copy data from a first storage array to a second storage array, to receive IO processing pressure feedback from at least one of the storage arrays, and to adjust a rate of at least a portion of the background copy process based at least in part on the received IO processing pressure feedback.

These and other embodiments can provide significantly improved performance, for example, in situations in which the background copy process is implemented in accordance with a mirroring arrangement or other similar arrangement in which the host device communicates with the first storage system over a first set of paths and communicates with the second storage system over a second set of paths, where the first and second sets of paths have substantially different performance characteristics.

In one embodiment, an apparatus comprises at least one processing device comprising a processor and a memory coupled to the processor. The at least one processing device is configured to initiate a background copy process in a host device to copy data from a first storage system to a second storage system, to receive IO processing pressure feedback from at least one of the first and second storage systems, and to adjust one or more characteristics of the background copy process based at least in part on the received IO processing pressure feedback.

The at least one processing device illustratively comprises at least a portion of the host device, with the host device being coupled to the first and second storage systems via at least one network.

In some embodiments, the at least one processing device may comprise host level mirroring (HLM) logic configured to control execution of the background copy process for one or more logical storage devices.

Adjusting one or more characteristics of the background copy process based at least in part on the received IO processing pressure feedback in some embodiments more particularly comprises reducing or otherwise modifying a rate of the background copy process responsive to the received IO processing pressure feedback.

By way of example, such embodiments can additionally or alternatively involve throttling a rate at which IO operations of the background copy process are sent to the first and second storage systems relative to the rates at which other IO operations of one or more other processes executing on the host device are sent to the first and second storage systems, for at least a specified throttling period.

In some embodiments, at least portions of initiating the background copy process, receiving IO processing pressure feedback, and adjusting one or more characteristics of the background copy process based at least in part on the received IO processing pressure feedback are implemented within or otherwise utilizing a multi-path layer of the host device. The multi-path layer illustratively comprises at least one multi-path input-output (MPIO) driver configured to process IO operations of the host device that communicates with the first and second storage systems over the network.

These and other illustrative embodiments include, without limitation, apparatus, systems, methods and computer program products comprising processor-readable storage media.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources, as well as other types of systems comprising a combination of cloud and edge infrastructure. Numerous different types of enterprise computing and storage systems are also encompassed by the term "information processing system" as that term is broadly used herein.

Figure 1:
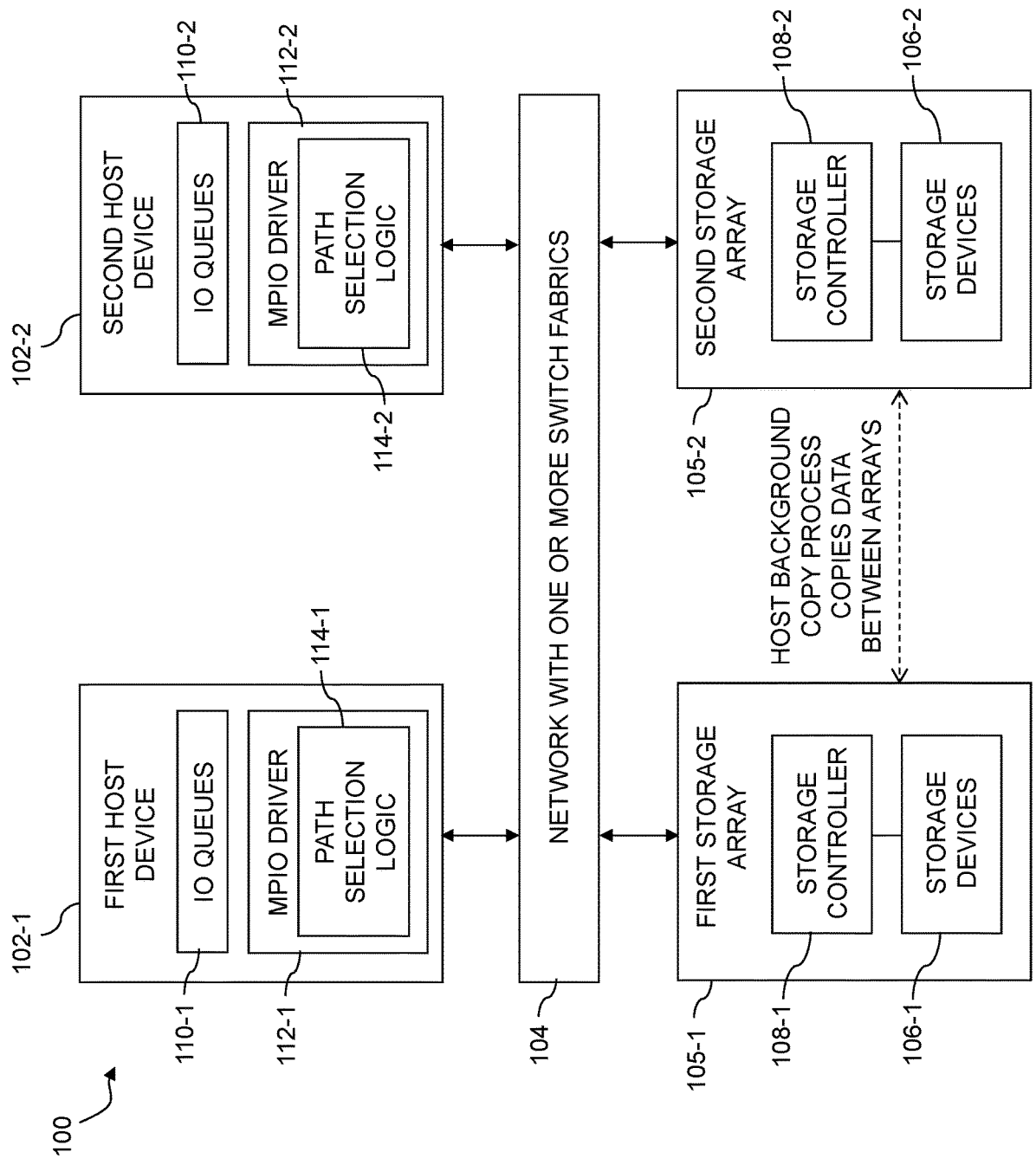
FIG. 1 is a block diagram of an information processing system configured with functionality for controlling a host background copy process utilizing IO processing pressure feedback in an illustrative embodiment.

FIG. 1 shows an information processing system 100 configured in accordance with an illustrative embodiment. The information processing system 100 comprises at least first and second host devices 102-1 and 102-2, collectively referred to herein as host devices 102. The host devices 102 are coupled to a network 104 that comprises one or more switch fabrics. The host devices 102 communicate over the network 104 via the one or more switch fabrics with at least first and second storage arrays 105-1 and 105-2, also collectively referred to herein as first and second storage arrays 105, or simply storage arrays 105. For example, in some embodiments the network 104 illustratively comprises at least one storage area network (SAN) and the one or more switch fabrics illustratively comprise respective distinct switch fabrics of a set of multiple switch fabrics interconnecting the host devices 102 with the storage arrays 105 over the one or more SANs. Each of the one or more switch fabrics in some embodiments is associated with a different SAN.

The system 100 may be configured such that the first host device 102-1 communicates with the first storage array 105-1 over a first switch fabric and communicates with the second storage array 105-2 over a second switch fabric. Similarly, the second host device 102-2 can communicate with the first storage array 105-1 over the first switch fabric and communicate with the second storage array 105-2 over the second switch fabric. Numerous other interconnection arrangements are possible.

Also, other types of networks can be used in other embodiments, and references to SANs, switch fabrics or other particular network arrangements herein are for purposes of illustration only, as non-limiting examples.

Although only two host devices 102 and two storage arrays 105 are shown in the figure, this is by way of illustrative example only, and other embodiments can include additional instances of such elements. It is also possible that alternative embodiments may include only a single host device and/or a single storage array.

The host devices 102 illustratively comprise respective computers, servers or other types of processing devices configured to communicate with the storage arrays 105 over the network 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102. The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model, a Function-as-a-Service (FaaS) model and/or a Storage-as-a-Service (STaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 may be implemented using multiple networks of different types to interconnect the various components of the information processing system 100. For example, the network 104 may comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) and/or other types of communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Although illustratively shown as separate from the network 104 in the figure, at least portions of the storage arrays 105 may be considered part of the network 104 in some embodiments. For example, in embodiments in which the network 104 comprises at least one SAN, the storage arrays 105 may be viewed as part of the one or more SANs.

The first and second storage arrays 105-1 and 105-2 comprise respective sets of storage devices 106-1 and 106-2, collectively referred to herein as storage devices 106, coupled to respective storage controllers 108-1 and 108-2, collectively referred to herein as storage controllers 108.

The storage devices 106 of the storage arrays 105 illustratively comprise solid state drives (SSDs). Such SSDs in some embodiments are implemented using non-volatile memory (NVM) devices such as flash memory. Other types of NVM devices that can be used to implement at least a portion of the storage devices 106 include non-volatile random access memory (NVRAM), phase-change RAM (PC-RAM), magnetic RAM (MRAM), resistive RAM, spin torque transfer magneto-resistive RAM (STT-MRAM), and Intel Optanem devices based on 3D XPoint™ memory. These and various combinations of multiple different types of storage devices may also be used. For example, hard disk drives (HDDs) can be used in combination with or in place of SSDs or other types of NVM devices.

A given storage system as the term is broadly used herein can therefore include a combination of different types of storage devices, as in the case of a multi-tier storage system comprising, for example, a memory-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives, NVM drives or other types of SSDs while the capacity tier comprises HDDs. The particular storage devices used in a given storage tier may be varied in other embodiments, and multiple distinct storage device types may be used within a single storage tier. The term "storage device" as used herein is intended to be broadly construed, so as to encompass, for example, SSDs, HDDs, flash drives, NVM drives, hybrid drives or other types of storage devices. In some embodiments, at least one of the storage arrays 105 illustratively comprises one or more PowerMax™ storage arrays, commercially available from Dell Technologies.

As another example, one or both of the storage arrays 105 may comprise respective clustered storage systems, each including a plurality of storage nodes interconnected by one or more networks. An example of a clustered storage system of this type is a scale-out all-flash content addressable storage array distributed over multiple storage nodes.

A given storage system as the term is broadly used herein can additionally or alternatively comprise, for example, network-attached storage (NAS), direct-attached storage (DAS) and distributed DAS.

Other additional or alternative types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

As mentioned above, communications between the host devices 102 and the storage arrays 105 within the system 100 may utilize PCIe connections or other types of connections implemented over one or more networks such as network 104. For example, illustrative embodiments can use interfaces such as Internet SCSI (iSCSI), Serial Attached SCSI (SAS) and Serial ATA (SATA). Numerous other interfaces and associated communication protocols can be used in other embodiments.

The storage arrays 105 in some embodiments may be implemented as part of cloud infrastructure in the form of a cloud-based system.

As is apparent from the foregoing, terms such as "storage array" and "storage system" as used herein are intended to be broadly construed, and a given such storage array or storage system may encompass, for example, multiple distinct instances of a commercially-available storage array.

The storage devices 106 of the storage arrays 105 are configured to store data utilized by one or more applications running on one or more of the host devices 102. The storage devices 106 on one of the storage arrays 105 are illustratively arranged in one or more storage pools. The storage arrays 105 and their corresponding storage devices 106 are examples of what are more generally referred to herein as "storage systems." A given such storage system in the present embodiment may be shared by the host devices 102, and in such arrangements may be referred to as a "shared storage system."

The storage devices 106 of the storage arrays 105 illustratively implement logical units (LUNs) configured to store objects for users associated with the host devices 102. These objects can comprise files, blocks or other types of objects. The host devices 102 interact with the storage arrays 105 utilizing read and write commands as well as other types of commands that are transmitted over the network 104. The above-noted LUNs are examples of what are more generally referred to herein as logical storage volumes, or still more generally, logical storage devices.

The read and write commands in some embodiments more particularly comprise SCSI commands, although other types of commands may be used in other embodiments, including commands that are part of a standard command set, such as NVMe commands, or custom commands such as a "vendor unique command" or VU command that is not part of a standard command set.

A given IO operation as that term is broadly used herein illustratively comprises one or more such commands. References herein to terms such as "input-output" and "IO" should be understood to refer to input and/or output. Thus, an IO operation relates to at least one of input and output. For example, an IO operation can comprise at least one read IO operation and/or at least one write IO operation. More particularly, IO operations may comprise write requests and/or read requests directed to stored data of a given one of the storage arrays 105.

Each IO operation is assumed to comprise one or more commands for instructing at least one of the storage arrays 105 to perform particular types of storage-related functions such as reading data from or writing data to particular logical storage volumes or other logical storage devices of one or more of the storage arrays 105. Such commands are assumed to have various payload sizes associated therewith, and the payload associated with a given command is referred to herein as its "command payload."

A command directed by one of the host devices 102 to one of the storage arrays 105 is considered an "outstanding" command until such time as its execution is completed in the viewpoint of the sending host device, at which time it is considered a "completed" command. The commands illustratively comprise respective SCSI commands, although other command formats can be used in other embodiments. A given such command is illustratively defined by a corresponding command descriptor block (CDB) or similar format construct. The given command can have multiple blocks of payload associated therewith, such as a particular number of 512-byte SCSI blocks or other types of blocks.

Also, the term "storage device" as broadly used herein can encompass, for example, a logical storage device such as a LUN or other logical storage volume. A logical storage device can be defined in the storage arrays 105 to include different portions of one or more physical storage devices. The storage devices 106 may therefore be viewed as comprising respective LUNs or other logical storage volumes.

Each of the host devices 102 illustratively has multiple paths to each of the storage arrays 105 via the network 104, with at least one of the storage devices 106 of one of the storage arrays 105 being visible to that host device on a given one of the paths, although numerous other arrangements are possible. A given one of the storage devices 106 may be accessible to a given host device over multiple paths. Different ones of the host devices 102 can have different numbers and types of paths to the storage arrays 105.

Different ones of the storage devices 106 of the storage arrays 105 illustratively exhibit different latencies in processing of IO operations. In some cases, the same storage device may exhibit different latencies for different ones of multiple paths over which that storage device can be accessed from a given one of the host devices 102.

The host devices 102, network 104 and storage arrays 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

As a more particular example, the host devices 102 in some embodiments illustratively comprise an ESXi environment or other type of host environment that supports non-disruptive movement of applications between ESXi servers or other types of servers, possibly using vMotion or other similar techniques to move VMs, in which those application execute, from one server to another server.

It is assumed in illustrative embodiments that the host devices 102 and storage arrays 105 are configured to support a host background copy process that copies data of one or more logical storage volumes or other logical storage devices between the storage arrays 105, as indicated by the horizontal dashed line in the figure. Any of a wide variety of different types of data copying arrangements can be supported, including by way of example various types of migration and/or replication arrangements. The term "background copy process" as used herein is therefore intended to be broadly construed, but generally encompasses an arrangement in which data is copied between the storage arrays 105 under the control of at least one of the host devices 102 at least in part while one or more other application processes are executing on the host devices 102. A given such other application process is also referred to herein as a "foreground process," to be distinguished from the background copy process. The background copy process in some embodiments is implemented in accordance with an HLM arrangement, although other arrangements can be used.

Additional examples of processing platforms utilized to implement storage systems and possibly one or more associated host devices in illustrative embodiments will be described in more detail below.

The host devices 102 and the storage arrays 105 may be implemented on respective distinct processing platforms, although numerous other arrangements are possible. For example, in some embodiments at least portions of the host devices 102 and the storage arrays 105 are implemented on the same processing platform. The storage arrays 105 can therefore be implemented at least in part within at least one processing platform that implements at least a subset of the host devices 102.

The term "processing platform" as used herein is intended to be broadly construed so as to encompass, by way of illustration and without limitation, multiple sets of processing devices and associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage arrays 105. The storage arrays 105 can be similarly distributed across multiple data centers.

Although in some embodiments certain commands used by the host devices 102 to communicate with the storage arrays 105 illustratively comprise SCSI commands, other types of commands and command formats can be used in other embodiments. For example, some embodiments can implement IO operations utilizing command features and functionality associated with the NVMe access protocol, as described in the NVMe Base Specification, Revision 2.0b, Jan. 6, 2022, which is incorporated by reference herein. Other storage access protocols of this type that may be utilized in illustrative embodiments disclosed herein include NVMe over Fabric, also referred to as NVMeoF, and NVMe over Transmission Control Protocol (TCP), also referred to as NVMe/TCP.

The first and second storage arrays 105-1 and 105-2 in some embodiments may be arranged in an active-active configuration, although use of such a configuration is not required. In an example of an active-active configuration that may be used, data stored in one of the storage arrays 105 is replicated to the other one of the storage arrays 105 utilizing a replication process. Such data replication across the multiple storage arrays 105 can be used to facilitate failure recovery in the system 100. One of the storage arrays 105 may therefore operate as a production storage array relative to the other storage array which operates as a backup or recovery storage array. Examples of active-active configurations include "metro" or "stretched" high availability storage array configurations. The term "active-active configuration" as used herein is therefore intended to be broadly construed.

The first and second storage arrays 105-1 and 105-2 in some embodiments may be configured to participate in a replication process, such as a synchronous replication process. In accordance with one type of synchronous replication process, a given one of the host devices 102 writes data to one of the storage arrays 105, and that host device receives an acknowledgement of success only after the data has been successfully written to both of the storage arrays 105. For example, if the host device directs a write to the first storage array 105-1, that storage array mirrors the write to the second storage array 105-2 and receives an acknowledgement of success back from the second storage array 105-2. The first storage array 105-1 then responds back to the host device with an acknowledgement of success.

This type of synchronous replication process is therefore configured to mirror data writes from one or more of the host devices 102 to both of the storage arrays 105. Other types of replication processes may be used in other embodiments.

For example, a "replication process" as that term is broadly used herein may include both asynchronous and synchronous replication modes as well as support for concurrent operation of such modes and separate operation of the individual modes. It is also possible in some embodiments that a given replication process implemented using storage arrays 105 may comprise only synchronous replication or only asynchronous replication, instead of multiple distinct replication modes.

A given logical storage device implemented on one or both of the storage arrays 105 in the system 100 illustratively comprises a set of one or more LUNs or other logical storage volumes of one or both of the storage arrays 105. Each such LUN or other logical storage volume is assumed to comprise at least a portion of a physical storage space of one or more of the storage devices 106 of the corresponding storage arrays 105.

The host devices 102 comprise respective sets of IO queues 110-1 and 110-2, and respective MPIO drivers 112-1 and 112-2. The MPIO drivers 112 collectively comprise a multi-path layer of the host devices 102. The multi-path layer provides path selection functionality for IO operations using respective instances of path selection logic 114-1 and 114-2 implemented within the MPIO drivers 112, and also illustratively provides related host background copy functionality utilizing IO processing pressure feedback as disclosed herein. For example, in some embodiments, the host devices 102 further comprise respective instances of HLM logic, possibly implemented at least in part within the MPIO drivers 112, to control performance of a background copy process to copy data of one or more logical storage volumes or other logical storage devices between the storage arrays 105.

A given instance of HLM logic in some embodiments illustratively comprises an HLM driver of the corresponding host device, and may be implemented separately from the MPIO driver of that host device.

The MPIO drivers 112 may comprise, for example, otherwise conventional MPIO drivers, such as PowerPath© drivers from Dell Technologies, suitably modified in the manner disclosed herein to support at least portions of the disclosed host background copy functionality utilizing IO processing pressure feedback. Other types of MPIO drivers from other driver vendors may be suitably modified to incorporate host background copy functionality utilizing IO processing pressure feedback as disclosed herein.

The MPIO driver 112-1 is configured to select IO operations from its corresponding set of IO queues 110-1 for delivery to the storage arrays 105 over the network 104. The sources of the IO operations stored in the set of IO queues 110-1 illustratively include respective processes of one or more applications executing on the host device 102-1. In illustrative embodiments, such processes include at least a background copy process, also referred to herein as simply a "background process," and one or more additional processes, also referred to herein as respective "foreground processes." Other types of sources of IO operations may be present in a given implementation of system 100.

The paths over which the IO operations are sent from the host device 102-1 to the storage arrays 105 illustratively comprise paths associated with respective initiator-target pairs, with each initiator comprising a host bus adaptor (HBA) or other initiating entity of the host device 102-1 and each target comprising a storage array port or other targeted entity corresponding to one or more of the storage devices 106 of the storage arrays 105. As noted above, the storage devices 106 of the storage arrays 105 illustratively comprise LUNs or other types of logical storage devices.

For example, in selecting particular ones of the paths for delivery of the IO operations to the storage arrays 105, the path selection logic 114-1 of the MPIO driver 112-1 illustratively implements a path selection algorithm that selects particular ones of the paths at least in part as a function of path information such as host device HBA and storage array port, with the path selection algorithm being configured to balance the IO operations over the paths or to achieve other load balancing or performance goals.

Selecting a particular one of multiple available paths for delivery of a selected one of the IO operations of the set of IO queues 110-1 is more generally referred to herein as "path selection." Path selection as that term is broadly used herein can in some cases involve both selection of a particular IO operation and selection of one of multiple possible paths for accessing a corresponding logical storage device of one of the storage arrays 105. The corresponding logical storage device illustratively comprises a LUN or other logical storage volume to which the particular IO operation is directed.

A given retry of a failed IO operation under such a path selection algorithm can select a path having a different host device HBA and storage array port for a given retry than that of the path selected for the original failed IO operation.

The paths between the host devices 102 and the storage arrays 105 can change over time. For example, the addition of one or more new paths from host device 102-1 to the storage arrays 105 or the deletion of one or more existing paths from the host device 102-1 to the storage arrays 105 may result from respective addition or deletion of at least a portion of the storage devices 106 of the storage arrays 105. Addition or deletion of paths can also occur as a result of zoning and masking changes or other types of storage system reconfigurations performed by a storage administrator or other user.

In some embodiments, paths are added or deleted in conjunction with addition of a new storage array or deletion of an existing storage array from a storage system that includes multiple storage arrays, possibly in conjunction with configuration of the storage system for at least one of a migration operation and a replication operation.

In these and other situations, path discovery scans may be repeated as needed in order to discover the addition of new paths or the deletion of existing paths.

A given path discovery scan can be performed utilizing known functionality of conventional MPIO drivers, such as PowerPath© drivers.

The path discovery scan in some embodiments may be further configured to identify one or more new LUNs or other logical storage volumes associated with the one or more new paths identified in the path discovery scan. The path discovery scan may comprise, for example, one or more bus scans which are configured to discover the appearance of any new LUNs that have been added to the storage arrays 105 as well to discover the disappearance of any existing LUNs that have been deleted from the storage arrays 105.

The MPIO driver 112-1 in some embodiments comprises a user-space portion and a kernel-space portion. The kernel-space portion of the MPIO driver 112-1 may be configured to detect one or more path changes of the type mentioned above, and to instruct the user-space portion of the MPIO driver 112-1 to run a path discovery scan responsive to the detected path changes. Other divisions of functionality between the user-space portion and the kernel-space portion of the MPIO driver 112-1 are possible.

For each of one or more new paths identified in the path discovery scan, the host device 102-1 may be configured to execute a host registration operation for that path. The host registration operation for a given new path illustratively provides notification to the corresponding one of the storage arrays 105 that the host device 102-1 has discovered the new path.

As is apparent from the foregoing, MPIO driver 112-1 of host device 102-1 is configured to control delivery of IO operations from the host device 102-1 to the first and second storage arrays 105 over selected paths through the network 104.

The MPIO driver 112-1 is also illustratively configured to implement at least portions of the host background copy functionality of host device 102-1, in some embodiments disclosed herein, possibly utilizing HLM logic. Other host device components, such as HLM logic implemented in one or more host device processors external to the MPIO driver 112-1, can additionally or alternatively implement aspects of the host background copy functionality of the host device 102-1. The disclosed embodiments are therefore not limited to embodiments in which host background copy functionality utilizing IO processing pressure feedback is controlled at least in part by an MPIO driver or multi-path layer.

Illustrative embodiments disclosed herein advantageously address and overcome problems that might otherwise arise when executing background copy processes to copy data between storage arrays under the control of a host device.

For example, some embodiments disclosed herein can provide significantly improved performance in situations in which the background copy process is implemented in accordance with an HLM arrangement or other similar arrangement in which the host device 102-1 communicates with the first storage array 105-1 over a first set of paths and communicates with the second storage array 105-2 over a second set of paths, where the first and second sets of paths have substantially different performance characteristics.

Such a situation can arise, for example, when there is an existing set of paths to one array, and then a new array is added, thereby introducing a new set of paths, with the intention to copy the logical storage device data from the first array to the second array. This may happen on array replacement (e.g., when replacing an old array with a new array), on cross-array protocol conversions (e.g., converting from an array using SCSI-FC to an array using NVMe/TCP) and/or under numerous other conditions.

When a host background copy process is initiated, the process begins to copy data from the first array to the second array. The background copy process generally works well if both sets of paths to the first and second arrays have approximately the same performance. However, if both sets of paths have different levels of performance, an application IO, also referred to herein as a "foreground" IO to be distinguished from an IO of a background copy process, may be processed quickly in the first array via the first set of paths but have its processing delayed in the second array via the second set of paths, or vice versa. In these and other similar contexts, absent use of the techniques disclosed herein, overall system performance can be significantly degraded, particular in the presence of substantial performance differences between the sets of paths. As indicated previously, such problems are addressed and solved by illustrative embodiments disclosed herein.

In accordance with the host background copy functionality disclosed herein, a given one of the host devices 102, illustratively the host device 102-1, is configured to initiate a host background copy process to copy data of one or more logical storage volumes or other logical storage devices from the first storage array 105-1 to the second storage array 105-2. The host device 102-1 is further configured to receive IO processing pressure feedback from at least one of the first storage array 105-1 and the second storage array 105-2, and to adjust one or more characteristics of the background copy process based at least in part on the received IO processing pressure feedback.

The host device 102-1 is an example of what is more generally referred to herein as "at least one processing device" that includes a processor coupled to a memory. Other types and arrangements of one or more processing devices may be utilized in other embodiments to implement the disclosed host background copy functionality.

As indicated above, in some embodiments, the host device 102-1 implements HLM logic, with the HLM logic being configured to control execution of the background copy process for one or more logical storage devices in accordance with an HLM arrangement.

For example, first and second sets of paths may be associated with two different "legs" of an HLM arrangement, or other configuration involving two different storage arrays 105, possibly at different physical locations, although numerous alternative non-HLM configurations are possible. Each of the arrays is associated with or "on" a corresponding one of the HLM legs. Some embodiments herein provide an advantageous methodology to ensure that performance is not undermined even when the two arrays on the two HLM legs have different performance characteristics.

Adjusting one or more characteristics of the background copy process based at least in part on the received IO processing pressure feedback in some embodiments comprises reducing or otherwise modifying a rate of the background copy process responsive to the received IO processing pressure feedback.

Additionally or alternatively, adjusting one or more characteristics of the background copy process based at least in part on the received IO processing pressure feedback illustratively comprises throttling a rate at which IO operations of the background copy process are sent to the first and second storage arrays 105 relative to the rates at which other IO operations of one or more other processes executing on the host device are sent to the first and second storage arrays 105, for at least a specified throttling period.

In some embodiments, receiving IO processing pressure feedback information from at least one of the first and second storage arrays 105 comprises receiving at least one notification from at least one of the first and second storage arrays 105 that IO processing pressure in at least one of the first and second storage arrays 105 has exceeded at least one specified threshold.

For example, the at least one notification in some embodiments comprises an indication that at least one of the first and second storage arrays 105 has one or more of (i) at least one storage array processor having a percentage utilization above a first specified threshold, and (ii) at least one storage array port having a bandwidth utilization above a second specified threshold.

As another example, the at least one notification in some embodiments comprises an indication that at least one of the first and second storage arrays 105 has at least one logical storage device having at least one of an IO rate, a write pending count and a response time metric above a corresponding specified threshold.

In some embodiments, the at least one notification is generated by at least one of the first and second storage arrays 105 artificially failing at least one IO operation sent by the host device 102-1 to that storage array.

The at least one notification illustratively comprises a check condition notification, although a wide variety of additional or alternative notifications can be used. The term "notification" as used herein is therefore intended to be broadly construed, so as to encompass, for example, messages or other types and arrangements of information that may be sent from a storage array to a host device, possibly in response to a request previously received from the host device, or that may be otherwise obtained by the host device from the storage array. For example, it is possible for a given notification to be obtained directly by the host device from the storage array, using an in-band arrangement based on commands of a storage access protocol such as SCSI or NVMe, or indirectly by the host device from the storage array using an out-of-band arrangement, possibly involving at least one intermediary device such as an MPIO management station or another type of external server. These and numerous other in-band or out-of-band communication arrangements can be used to allow a host device to obtain IO processing pressure information from a storage array in other embodiments.

In some embodiments, the MPIO driver 112-1 of the host device 102-1 is configured to accept the check condition notification and to treat a corresponding IO operation as having been successfully processed in a corresponding one of the first and second storage arrays 105 while also triggering the adjusting of the one or more characteristics of the background copy process. This can involve interaction between the MPIO driver 112-1 and an HLM driver or other type of HLM logic implemented externally to the MPIO driver 112-1 in the host device 102-1. As indicated previously, it is also possible for HLM logic to be implemented at least in part internally to the MPIO driver 112-1 in other embodiments.

In some embodiments, each of the storage arrays 105 is illustratively configured to notify the host device 102-1 of copy pressure that is experienced by that array relating to the IOs of the background copy process. These notifications are an example of what is more generally referred to herein as "copy pressure feedback" from the arrays. Such copy pressure may arise due to the background copy operation where a host background copy process is reading from one array and writing to the other. The increased load may be due to the read operations (e.g., reading from the first array), the write operations (e.g., writing to the second array) and/or any other IO activity on either of the arrays consuming too many array resources.

In order to provide the host device 102-1 with such copy pressure feedback, each of the storage arrays 105 is illustratively configured to detect copy pressure using one or more of the following performance metrics, although additional or alternative metrics can be used in other embodiments:

1. Percentage utilization of a storage array processor >X % (where X may be a user-configurable parameter).
2. Port link bandwidth utilization >Y % (where Y may be a user-configurable parameter).
3. Device IO statistics exceed a certain threshold, such as device IO rate >Z IOs/second (where Z may be a user-configurable parameter).
4. Device write pressure >A % (where A may be a user-configurable parameter). For example, the array may have a "device write pending limit" to ensure one device does not consume an excessive number of cache slots.
5. Device or volume response time exceeds a threshold response time B (where B may be a user-configurable parameter).

Again, these are only illustrative examples, and other types of performance metrics may be used to detect and indicate copy pressure in other embodiments.

Responsive to the array detecting IO processing pressure as per one or more of the above-listed performance metrics, the array sends a specialized message or other notification to the host. This specialized message or other notification may be, for example, a new check condition notification in SCSI, or an NVMe equivalent, although additional or alternative notifications can be used. The notification is illustratively configured to indicate that at least one path of the corresponding HLM leg, or a specific LUN or other logical storage device on that path, is busy. Such a notification may be implemented, for example, as VU check condition notification, or similar notification in other storage access protocols.

In some embodiments, these check condition notifications are reported once every R seconds from each of the storage arrays 105 to the host device 102-1, where R may be a user-configurable parameter. For example, in some embodiments, R may be set to a value such as 10 seconds, one minute, or another desired value, depending upon the particular needs of a given system implementation.

One option for such reporting from the array to the host is for the array to artificially fail an IO with such a check condition notification to indicate the pressure to the host, such that the host will retry the IO. Another option is to configure the MPIO driver to accept the check condition notification, identify and treat the IO as successful (e.g., report to the host device operating system that the IO has succeeded), but act on the check condition notification (if the MPIO driver is the driver performing the copy) or otherwise report it to an HLM driver in the host device operating system.

The action, illustratively performed by an MPIO driver, once such specialized message is received, is to lower the rate of the background copy process to that leg (e.g., application IOs must be processed when they arrive but background copy IOs can wait) for W seconds and then continue as usual, where W may be a user-configurable parameter, and like the above-noted value R can vary depending upon the particular needs of a given system implementation.

Additionally or alternatively, one or more hysteresis mechanisms may be implemented in the host where a host driver will wait a longer period with receiving more such specialized messages (e.g., more IO load notification will cause a longer wait before continuing with the background copy). This is in contrast to arrangements that deploy copy ceiling/pacing mechanisms which are controlled manually and are not in response to array pressure, where such arrangements set a certain copy performance ceiling (e.g., throttle the copy speed) regardless of whether such throttling is needed or not.

Some embodiments are configured to notify the host device that there is an IO processing pressure issue before there is a performance impact to the application. For example, in an illustrative embodiment, if a certain port (or a full device on all ports) is becoming too busy (e.g., crossing a user-configurable threshold) then the background copy process will automatically lower the rate at which IOs are sent to that port or full device.

As indicated previously, some background copy arrangements may include a ceiling/pacing mechanism which operate to limit the copy speed. However, such ceiling/pacing mechanisms are generally not dependent on the target load (e.g., full target load, a certain path load or certain device load).

Some QOS-based arrangements (e.g., VMware Storage I/O Control (SIOC)) measure the latency that the VMs with a higher SLO (e.g., Diamond) are getting, and impact the performance that the VMs with a lower SLO (e.g., Bronze) are getting. However, it is generally not possible to implement a HLM configuration where the application IOs are in one VM with a higher SLO (e.g., Diamond) and the background copy IOs are in a different VM with a lower SLO (e.g., Bronze), as the HLM configuration, while the host copy is in progress, typically must have the two sets of operations (i.e., application IOs and background copy IOs) in the same VM/process in order to ensure that the background copy is not overwriting application IOs. For example, such an overwrite may occur if an application IO writes to data at a logical block address "1000" while the background copy process is still at logical block address "0100," and later the background copy process overwrites the data at logical block address "1000" with older data.

These and other issues are addressed by the illustrative embodiments disclosed herein. For example, as described above, some embodiments disclosed herein advantageously provide different types of performance handling for application IOs (also referred to herein as "foreground" IOs) and the background copy IOs.

At least portions of the host background copy functionality in illustrative embodiments is implemented within or otherwise utilizing the MPIO driver 112-1. For example, the MPIO driver 112-1 in some embodiments is configured to perform at least portions of the above-noted initiating the background copy process, receiving IO processing pressure feedback, and adjusting one or more characteristics of the background copy process based at least in part on the received IO processing pressure feedback.

Although MPIO driver 112-1 is utilized to perform certain aspects of the host background copy functionality in some embodiments, this is by way of illustrative example only, and other embodiments need not utilize MPIO drivers in implementing such functionality. For example, Linux native multi-pathing arrangements utilizing device mappers, or other types and arrangements of host device components, can be configured to control host background copy processes utilizing IO processing pressure feedback from one or more storage arrays or other types of storage systems as disclosed herein.

In some embodiments, the host device 102-1 implements at least portions of the background copy process utilizing PowerPath© Migration Enabler (PPME) or other suitable migration software. The term "host background copy process" as used herein is therefore intended to be broadly construed, so as to encompass, for example, a wide variety of different host-based mechanisms for replicating, migrating or otherwise copying data of one or more logical storage volumes or other types of logical storage devices.

These and other host background copy processes referred to herein are only illustrative examples, and numerous other types and configurations of host background copy processes can be used in other embodiments.

In addition, although the above-described host background copy functionality is primarily described above in the context of host device 102-1 and its MPIO driver 112-1, it is assumed that similar host background copy functionality is implemented by host device 102-2 and its MPIO driver 112-2.

It should be noted that references in the above description and elsewhere herein to single instances of source and target logical storage devices are non-limiting, and other embodiments can migrate multiple source logical storage devices to respective target logical storage devices, through straightforward modification of the techniques disclosed herein, as will be readily apparent to those skilled in the art.

As indicated above, the above-described host background copy functionality utilizing IO processing pressure feedback is illustratively carried out at least in part utilizing the MPIO driver 112-1 and its path selection logic 114-1. For example, in some embodiments, the host background copy functionality can be implemented substantially entirely under the control of the MPIO driver 112-1, and in such embodiments the path selection logic 114-1 is illustratively configured to control performance of one or more steps of the flow diagram to be described below in conjunction with FIG. 2. Additional or alternative host device components, such as HLM logic implemented in the host device, can be used to control performance of a host background copy process in illustrative embodiments.

It is assumed that the other MPIO driver 112-2 is configured in a manner similar to that described above and elsewhere herein for the first MPIO driver 112-1. The MPIO driver 112-2 is therefore similarly configured to select IO operations from its corresponding one of the sets of IO queues 110 for delivery to the storage arrays 105 over the network 104 and to perform at least portions of the disclosed host background copy functionality.

Accordingly, aspects of host background copy functionality described above in the context of the first MPIO driver 112-1 and the first host device 102-1 are assumed to be similarly performed by the other MPIO driver 112-2 and the other host device 102-2.

It is to be appreciated that the above-described features of system 100 and other features of other illustrative embodiments are presented by way of example only, and should not be construed as limiting in any way. Accordingly, different numbers, types and arrangements of system components such as host devices 102, network 104, storage arrays 105, storage devices 106, sets of IO queues 110, MPIO drivers 112 and instances of path selection logic 114 can be used in other embodiments.

It should also be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations. For example, as indicated previously, instances of HLM logic implemented in the host devices 102 and the storage arrays 105 can be used to perform at least portions of the host background copy functionality.

The operation of the information processing system 100 will now be described in further detail with reference to the flow diagram of the illustrative embodiment of FIG. 2. The process as shown includes steps 200 through 204, and is suitable for use in the system 100 but is more generally applicable to other types of systems comprising a host device and a storage system. The host device illustratively comprises a given one of the first and second host devices 102-1 and 102-2 of FIG. 1, and the first and second storage arrays illustratively comprise respective ones of the storage arrays 105, with each such storage array comprising a plurality of storage devices. The storage devices of each such storage array are assumed to include logical storage devices such as LUNs or other logical storage volumes.

Figure 2:
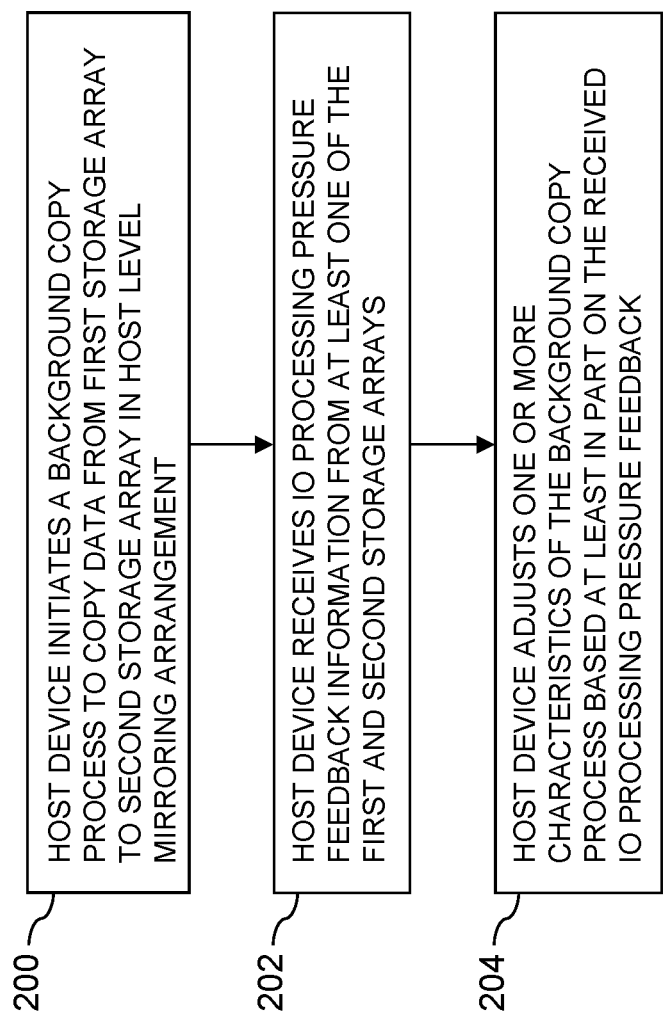
FIG. 2 is a flow diagram illustrating control of a host background copy process utilizing IO processing pressure feedback in an illustrative embodiment.

The steps of the FIG. 2 process are illustratively performed at least in part by or under the control of an MPIO layer comprising one or more MPIO drivers of respective host devices, such as the MPIO drivers 112-1 and 112-2 of the first and second host devices 102-1 and 102-2 of system 100, although other arrangements of system components can control or perform at least portions of one or more of the steps in other embodiments. For example, HLM logic, implementing with the MPIO drivers or externally to the MPIO drivers, can be used to control host background copy functionality such as that illustrated in FIG. 2. At least portions of the functionality of the FIG. 2 process may be performed at least in part in conjunction with a load balancing algorithm or other type of path selection algorithm executed by instances of path selection logic 114 of one or more MPIO drivers 112. A given host device is referred to as simply a "host" in some description herein.

In step 200, a host device initiates a background copy process to copy data from a first storage array to a second storage array in an HLM arrangement. For example, data may be copied from a source logical storage device in the first storage array to a target logical storage device in the second storage array. The identification of the source and target logical storage devices can be made at least in part responsive to input received from an administrator or other user via a user interface of the host. Each of the logical storage devices illustratively comprises a LUN or other type of logical storage volume implemented using one or more storage devices the first and second storage arrays. The HLM arrangement illustratively involves the host device communicating with the first storage array over a first set of paths and communicating with the second storage array over a second set of paths, where the first and second sets of paths have different performance characteristics.

In step 202, the host device receives IO processing pressure feedback from at least one of the first and second storage arrays. For example, in some embodiments, receiving IO processing pressure feedback information from at least one of the first and second storage arrays comprises receiving at least one notification from at least one of the first and second storage arrays that IO processing pressure in at least one of the first and second storage arrays has exceeded at least one specified threshold. The at least one notification may comprise, for example, an indication that at least one of the first and second storage arrays has one or more of (i) at least one storage array processor having a percentage utilization above a first specified threshold, and (ii) at least one storage array port having a bandwidth utilization above a second specified threshold. Additionally or alternatively, the at least one notification in some embodiments comprises an indication that at least one of the first and second storage arrays has at least one logical storage device having at least one of an IO rate, a write pending count and a response time metric above a corresponding specified threshold. These and other notifications comprising IO processing pressure feedback can comprise check condition notifications or other types of messages received in the host device from one or more of the storage arrays. The notifications may be received or otherwise obtained from the storage arrays using storage access protocol commands such as log sense, mode sense, vendor unique or other types of commands in accordance with a given storage access protocol such as SCSI or NVMe.

In step 204, the host device adjusts one or more characteristics of the background copy process based at least in part on the received IO processing pressure feedback. For example, in some embodiments, the host device adjusts one or more characteristics of the background copy process based at least in part on the received IO processing pressure feedback by reducing a rate of the background copy process responsive to the received IO processing pressure feedback. As another example, adjusting one or more characteristics of the background copy process based at least in part on the received IO processing pressure feedback illustratively comprises throttling a rate at which IO operations of the background copy process are sent to the first and second storage systems relative to the rates at which other IO operations of one or more other processes executing on the host device are sent to the first and second storage systems, for at least a specified throttling period. Additional or alternative adjustments can be made to one or more characteristics of the background copy process in other embodiments.

The steps of the FIG. 2 process are shown in sequential order for clarity and simplicity of illustration only, and certain steps can at least partially overlap with other steps. Also, different ones of the steps can be performed at least in part by different host device components, such as path selection logic or HLM logic of the host devices. Such components are illustratively part of an MPIO layer comprising one or more MPIO drivers, but in other embodiments can be implemented elsewhere in the host device.

As indicated above, different instances of the FIG. 2 process can execute at least in part in parallel with one another for different host background copy processes involving different source and target logical storage devices. Also, multiple additional instances of the FIG. 2 process can be performed in respective ones of one or more additional host devices that share the first and second storage arrays.

The particular processing operations and other system functionality described in conjunction with the flow diagram of FIG. 2 are presented by way of illustrative example only, and should not be construed as limiting the scope of the disclosure in any way. Alternative embodiments can use other types of processing operations involving host devices, storage systems and host background copy functionality. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different host background copy arrangements within a given information processing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Figure 3:
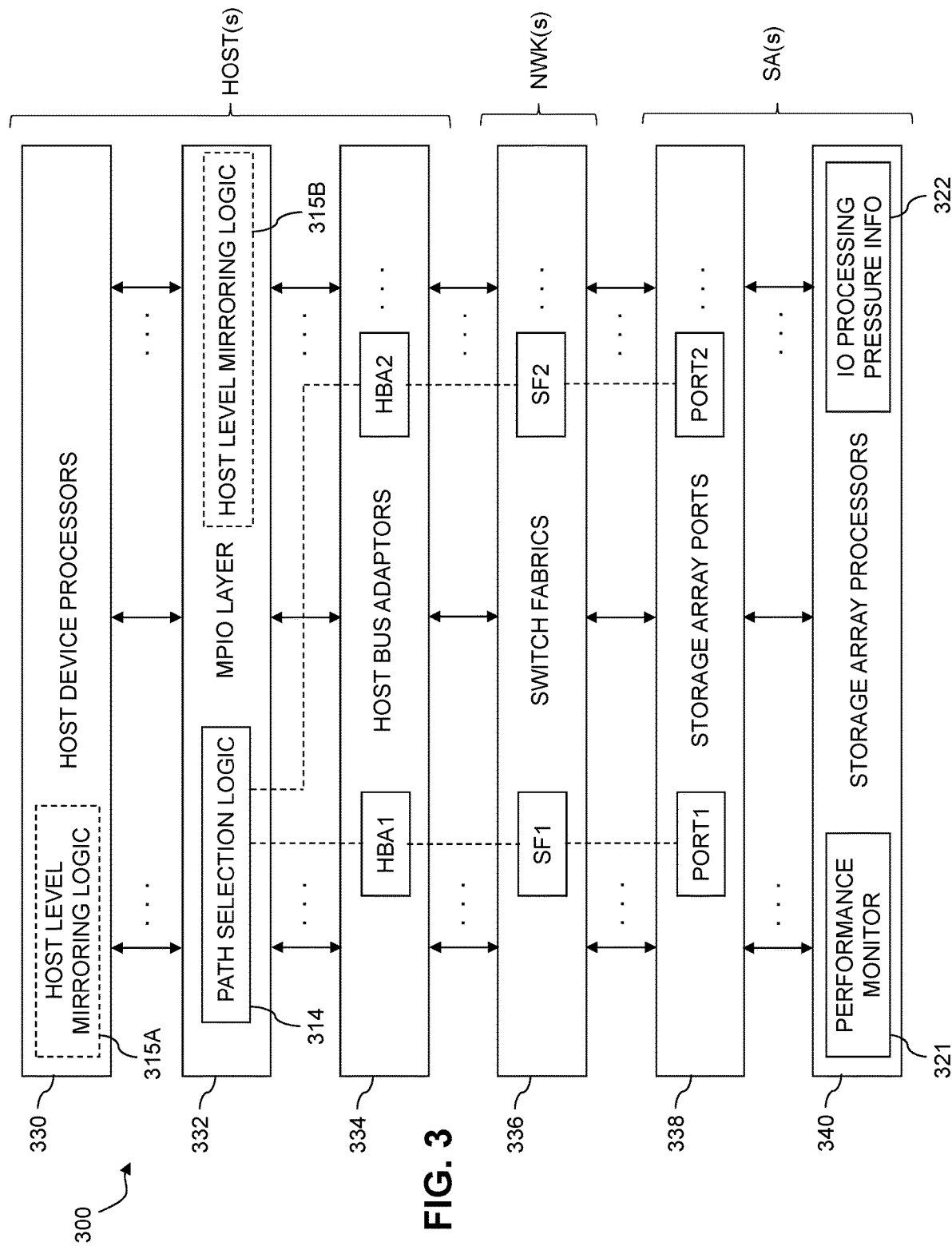
FIG. 3 is a block diagram showing multiple layers of a layered system architecture that includes functionality for controlling a host background copy process utilizing IO processing pressure feedback in an illustrative embodiment.

Referring now to FIG. 3, another illustrative embodiment is shown. In this embodiment, an information processing system 300 comprises host-side components that include path selection logic 314, HLM logic 315A and 315B, the latter two collectively referred to as HLM logic 315, and storage-side components that include performance monitor 321 and IO processing pressure information 322. Additional or alternative host-side and storage-side components can be used in other embodiments. The system 300 is configured in accordance with a layered system architecture that illustratively includes a host device processor layer 330, an MPIO layer 332, an HBA layer 334, a switch fabric layer 336, a storage array port layer 338 and a storage array processor layer 340. As illustrated in the figure, the host device processor layer 330, the MPIO layer 332 and the HBA layer 334 are associated with one or more host devices, the switch fabric layer 336 is associated with one or more SANs or other types of networks, and the storage array port layer 338 and storage array processor layer 340 are associated with one or more storage arrays ("SAs").

The system 300 in this embodiment implements functionality for host background copy of data of one or more logical storage devices utilizing IO processing pressure feedback. The logical storage devices store data for one or more application processes running in one or more host device processors of the host device processor layer 330. The host background copy functionality in this embodiment is assumed to be controlled at least in part by HLM logic 315, although other arrangements are possible.

The HLM logic 315 illustrative comprises respective portions 315A and 315B thereof that are implemented in the respective host device processor layer 330 and the MPIO layer 332 to control a host background copy process of the system 300. The HLM logic 315 can include multiple distinct HLM logic instances for respective ones of a plurality of host devices of the system 300. Each such instance can be separated across the layers 330 and 332 or implemented entirely within a given one of the layers 330 and 332, and the different portions 315A and 315B are therefore shown in dashed outline in the figure.

The performance monitor 321 implemented in the storage array processor layer 340 performs various types of performance measurements relating to IO operation processing by one or more storage arrays of the system 300. Such performance measurements are maintained by the one or more storage arrays in one or more data structures as IO processing pressure information 322. In some embodiments, there may be separate instances of the performance monitor 321 and the IO processing pressure information 322 for each of a plurality of storage arrays of the system 300.

The host-side component including path selection logic 314 and HLM logic 315 operate in conjunction with the storage-side components including performance monitor 321 and IO processing pressure information 322 to implement at least portions of the host background copy functionality utilizing IO processing pressure feedback as disclosed herein.

The MPIO layer 332 is an example of what is also referred to herein as a multi-path layer, and comprises one or more MPIO drivers implemented in respective host devices. Each such MPIO driver illustratively comprises an instance of path selection logic 314 configured to perform path selection for delivery of IO operations to the storage arrays of system 300 as previously described. As indicated above, the path selection logic 314 in some embodiments operates in conjunction with the HLM logic 315, the performance monitor 321 and the IO processing pressure information 322 in implementing at least portions of the host background copy functionality utilizing IO processing pressure feedback as disclosed herein. Additional or alternative layers and logic circuitry arrangements can be used in other embodiments.

In the system 300, path selection logic 314 is configured to select different paths for sending IO operations from a given host device to a storage array. These paths as illustrated in the figure include a first path from a particular HBA denoted HBA1 through a particular switch fabric denoted SF1 to a particular storage array port denoted PORT1, and a second path from another particular HBA denoted HBA2 through another particular switch fabric denoted SF2 to another particular storage array port denoted PORT2.

These two particular paths are shown by way of illustrative example only, and in many practical implementations there will typically be a much larger number of paths between the one or more host devices and the one or more storage arrays, depending upon the specific system configuration and its deployed numbers of HBAs, switch fabrics and storage array ports. For example, each host device in the FIG. 3 embodiment can illustratively have a set of n paths to a shared storage array, or alternatively different ones of the host devices can have different numbers and types of paths to the storage array.

The path selection logic 314 of the MPIO layer 332 in this embodiment therefore selects paths for delivery of IO operations to the one or more storage arrays having the storage array ports of the storage array port layer 338.

In this illustrative embodiment, the host devices and storage arrays of system 300, through their respective instances of components 315, 321 and 322, provide host background copy functionality utilizing IO processing pressure feedback as disclosed herein, possibly with involvement of other host device or system components, such as the path selection logic 314 of MPIO layer 332.

Some implementations of the system 300 can include a relatively large number of host devices (e.g., 1000 or more host devices), although as indicated previously different numbers of host devices, and possibly only a single host device, may be present in other embodiments. Each of the host devices is typically allocated with a sufficient number of HBAs to accommodate predicted performance needs. In some cases, the number of HBAs per host device is on the order of 4, 8 or 16 HBAs, although other numbers of HBAs could be allocated to each host device depending upon the predicted performance needs. A typical storage array may include on the order of 128 ports, although again other numbers can be used based on the particular needs of the implementation. The number of host devices per storage array port in some cases can be on the order of 10 host devices per port. The HBAs of the host devices are assumed to be zoned and masked to the storage array ports in accordance with the predicted performance needs, including user load predictions.

A given host device of system 300 can be configured to initiate an automated path discovery process to discover new paths responsive to updated zoning and masking or other types of storage system reconfigurations performed by a storage administrator or other user. For certain types of host devices, such as host devices using particular operating systems such as Windows, ESX or Linux, automated path discovery via the MPIO drivers of a multi-path layer is typically supported. Other types of host devices using other operating systems such as AIX in some implementations do not necessarily support such automated path discovery, in which case alternative techniques can be used to discover paths.

Figure 4:
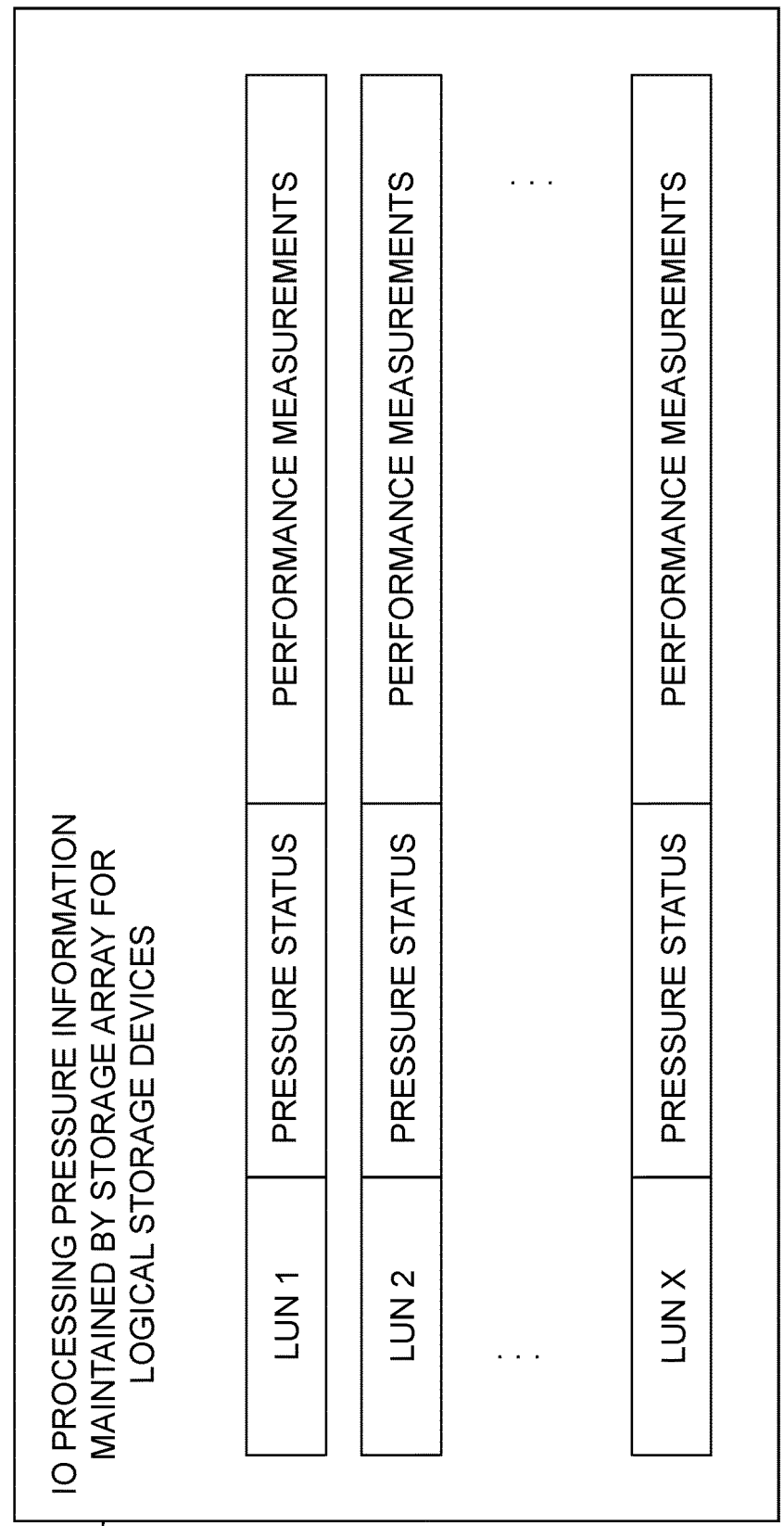
FIG. 4 shows an example of a data structure comprising IO processing pressure information maintained by a storage system for use in controlling a host background copy process in an illustrative embodiment.

Referring now to FIG. 4, an example of a set of IO processing pressure information 400 maintained by a storage system such as storage array 105-1 or 105-2 is shown. The IO processing pressure information 400 is illustratively maintained by the storage array for particular LUNs that are denoted LUN 1, LUN 2, . . . LUN X in the figure. These LUNs may comprise all of the LUNs of the storage array, or a designated subset of the LUNs of the storage array. Different sets of IO processing pressure information similar to IO processing pressure information 400 may be maintained for respective different sets of LUNs of the storage array. The IO processing pressure information 400 may be viewed as one possible example of IO processing pressure information 322 in the FIG. 3 embodiment.

The IO processing pressure information 400 more particularly includes performance measurements for each of the LUNs denoted LUN 1 through LUN X, as well as a corresponding pressure status indicator. The performance measurements in some embodiments comprise response time (RT) measurements compiled by the storage array 105 over a designated time period for IO operations directed to the corresponding LUNs. Additional or alternative performance metrics that can be used in generating the performance measurements include, for example, at least one of a storage array processor utilization, a storage array port bandwidth utilization, and an IO rate and write pending count for IO operations directed to the corresponding LUNs. More particularly, in some embodiments, the performance metrics can include one or more of a percentage utilization of a storage array processor and a bandwidth utilization of a storage array port. Numerous other combinations of these and other performance metrics can be used in determining the IO processing pressure status for various LUNs of the storage arrays in the IO processing pressure information 400.

The IO processing pressure status can be in the form of a binary indicator, providing an indication of whether or not the performance measurements for the corresponding LUN are above or below one or more specified thresholds. Other types of single bit or multi-bit pressure status indicators can be used in other embodiments.

Although the IO processing pressure information 400 is illustratively maintained on a per-LUN basis in this embodiment, other embodiments can maintain the information in other ways, including for example on a per-port and/or per-processor basis within the storage array, or possibly for the storage array as a whole.

At least portions of the IO processing pressure information 400 are obtained by one or more host devices and utilized by their respective instances of HLM logic to throttle a rate at which IO operations of the background copy process are sent to one or more storage arrays, relative to IO operations of one or more foreground processes that are also executing on the one or more host devices.

The particular IO processing pressure information arrangement shown in FIG. 4 is only an example, and numerous other types and arrangements of IO processing pressure information can be maintained by a storage system in other embodiments. Terms such as "JO processing pressure information" as used herein are intended to be broadly construed.

As indicated above, the MPIO driver of a given one of the host devices 102 can obtain IO processing pressure information from the storage array 105 by sending commands to the storage array 105, in the manner previously described.

The IO processing pressure information 400 is illustratively stored in a storage array memory accessible to a multi-path layer of the host device. Other types of data structures can be used in other embodiments.

On the host side, at least portions of such IO processing pressure information obtained from the storage array and characterizing one or more logical storage devices are illustratively stored in a data structure of a kernel-space portion of the MPIO driver 112-1, although other storage arrangements with other types of data structures can be used.

In some embodiments, an MPIO driver obtains IO processing pressure information directly from a storage array, through interaction with the storage array as described elsewhere herein. For example, MPIO driver 112-1 is illustratively configured to obtain the IO processing pressure information directly from the storage array 105 utilizing an in-band communication mechanism in which one or more commands in a designated storage protocol are sent from the MPIO driver 112-1 or another host device component to the storage array 105.

However, it is possible in some embodiments that one or more MPIO drivers of one or more host devices can obtain the IO processing pressure information other than through direct communication with the storage array. Such arrangements illustratively involve obtaining the connectivity information indirectly from the storage array utilizing an out-of-band communication mechanism via at least one intermediary device, such as an MPIO management station, which may comprise one or more servers.

The above-described processes, algorithms and other features and functionality disclosed herein are presented by way of illustrative example only, and other embodiments can utilize additional or alternative arrangements.

Also, as mentioned previously, different instances of the above-described processes, algorithms and other host background copy process control techniques can be performed by different MPIO drivers in different host devices, or using other types of host drivers, such as, for example, iSCSI drivers.

The particular host background copy process arrangements described above are therefore presented by way of illustrative example only. Numerous alternative arrangements of these and other features can be used in implementing host background copy processes in other illustrative embodiments.

It is apparent from the foregoing that the illustrative embodiments disclosed herein can provide a number of significant advantages relative to conventional arrangements.

For example, some embodiments configure host devices to include functionality for controlling a host background copy process based at least in part on IO processing pressure feedback from at least one storage array or other storage system.

As a more particular example, one or more illustrative embodiments configure a host device, implementing a background copy process to copy data from a first storage array to a second storage array, to receive IO processing pressure feedback from at least one of the storage arrays, and to adjust a rate of at least a portion of the background copy process based at least in part on the received IO processing pressure feedback.

These and other embodiments can provide significantly improved performance, for example, in situations in which the background copy process is implemented in accordance with a mirroring arrangement or other similar arrangement in which the host device communicates with the first storage system over a first set of paths and communicates with the second storage system over a second set of paths, where the first and second sets of paths have substantially different performance characteristics.

The disclosed functionality can be implemented using a wide variety of different host devices and storage systems.

It is to be appreciated that the particular advantages described above are associated with particular illustrative embodiments and need not be present in other embodiments. Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as virtual machines, or portions thereof, are illustratively implemented for use by tenants of such a multi-tenant environment.

Cloud infrastructure as disclosed herein can include cloud-based systems such as an Amazon Web Services (AWS) system, a Google Cloud Platform (GCP) system and a Microsoft Azure system. Virtual machines provided in such cloud-based systems can be used to implement a fast tier or other front-end tier of a multi-tier storage system in illustrative embodiments. A capacity tier or other back-end tier of such a multi-tier storage system can be implemented using one or more object stores such as Amazon S3, GCP Cloud Storage, and Microsoft Azure Blob Storage.

In some embodiments, the cloud infrastructure additionally or alternatively comprises a plurality of containers illustratively implemented using respective operating system kernel control groups of one or more container host devices. For example, a given container of cloud infrastructure illustratively comprises a Docker container or other type of LXC implemented using a kernel control group. The containers may run on virtual machines in a multi-tenant environment, although other arrangements are possible. The containers may be utilized to implement a variety of different types of functionality within the system 100. For example, containers can be used to implement respective compute nodes or storage nodes of a cloud-based system. Again, containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a central processing unit (CPU), a microprocessor, a microcontroller, an application-specific integrated circuit (ASIC), a field-programmable gate array (FPGA), a graphics processing unit (GPU) or other type of processing circuitry, as well as portions or combinations of such circuitry elements. The memory may comprise random access memory (RAM), read-only memory (ROM), flash memory or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of host devices 102, network 104 and storage arrays 105 are illustratively implemented in the form of software running on one or more processing devices. As a more particular example, the instances of path selection logic 114 may be implemented at least in part in software, as indicated previously herein.

It should again be emphasized that the above-described embodiments are presented for purposes of illustration only. Many variations and other alternative embodiments may be used. For example, the disclosed techniques are applicable to a wide variety of other types of information processing systems, utilizing other arrangements of host devices, networks, storage systems, storage arrays, storage devices, processors, memories, IO queues, MPIO drivers, path selection logic, HLM logic and additional or alternative components. Also, the particular configurations of system and device elements and associated processing operations illustratively shown in the drawings can be varied in other embodiments. For example, a wide variety of different host device and storage system configurations, host background copy processes, and associated IO processing pressure feedback arrangements can be used in other embodiments. Moreover, the various assumptions made above in the course of describing the illustrative embodiments should also be viewed as exemplary rather than as requirements or limitations. Numerous other alternative embodiments within the scope of the appended claims will be readily apparent to those skilled in the art.

What is claimed is:

1. An apparatus comprising:
   at least one processing device comprising a processor coupled to a memory;
   said at least one processing device being configured:
   to initiate a background copy process in a host device coupled to first and second storage systems to copy data from the first storage system to the second storage system, the host device being separate from the first and second storage systems;
   to receive in the host device input-output processing pressure feedback information from at least one of the first and second storage systems, the input-output processing pressure feedback information comprising at least one notification sent from at least one of the first and second storage systems to the host device and indicating at least a threshold level of processing pressure resulting in at least one of the first and second storage systems at least in part from processing of input-output operations of the background copy process; and to adjust in the host device one or more characteristics of the background copy process based at least in part on the received input-output processing pressure feedback.

2. The apparatus of claim 1 wherein said at least one processing device comprises at least a portion of the host device.

3. The apparatus of claim 1 wherein the at least one processing device comprises host level mirroring logic configured to control execution of the background copy process for one or more logical storage devices in accordance with a host level mirroring arrangement.

4. The apparatus of claim 1 wherein adjusting one or more characteristics of the background copy process based at least in part on the received input-output processing pressure feedback comprises reducing a rate of the background copy process responsive to the received input-output processing pressure feedback.

5. The apparatus of claim 1 wherein the host device comprises a multi-path layer, the multi-path layer comprising at least one multi-path input-output driver configured to control delivery of input-output operations from the host device to one or more of the first and second storage systems over selected paths through a network over which the host device communicates with the first and second storage systems.

6. The apparatus of claim 5 wherein said at least one multi-path input-output driver is configured to perform at least a portion of initiating the background copy process, receiving the input-output processing pressure feedback and adjusting one or more characteristics of the background copy process.

7. The apparatus of claim 1 wherein receiving input-output processing pressure feedback information from at least one of the first and second storage systems comprises receiving at least one notification from at least one of the first and second storage systems that input-output processing pressure in at least one of the first and second storage systems has exceeded at least one specified threshold.

8. The apparatus of claim 7 wherein the at least one notification comprises an indication that at least one of the first and second storage systems has one or more of (i) at least one storage system processor having a percentage utilization above a first specified threshold, and (ii) at least one storage system port having a bandwidth utilization above a second specified threshold.

9. The apparatus of claim 7 wherein the at least one notification comprises an indication that at least one of the first and second storage systems has at least one logical storage device having at least one of an input-output rate, a write pending count and a response time metric above a corresponding specified threshold.

10. The apparatus of claim 7 wherein the at least one notification is generated by at least one of the first and second storage systems artificially failing at least one input-output operation sent by the host device to that storage system.

11. The apparatus of claim 7 wherein the at least one notification comprises a check condition notification.

12. The apparatus of claim 11 wherein a multi-path layer of the host device is configured to accept the check condition notification and to treat a corresponding input-output operation as having been successfully processed in a corresponding one of the first and second storage systems while also triggering the adjusting of the one or more characteristics of the background copy process.

13. The apparatus of claim 1 wherein adjusting one or more characteristics of the background copy process based at least in part on the received input-output processing pressure feedback comprises throttling a rate at which input-output operations of the background copy process are sent to the first and second storage systems relative to the rates at which other input-output operations of one or more other processes executing on the host device are sent to the first and second storage systems, for at least a specified throttling period.

14. The apparatus of claim 1 wherein the background copy process is implemented in accordance with a host level mirroring arrangement in which the host device communicates with the first storage system over a first set of paths and communicates with the second storage system over a second set of paths, where the first and second sets of paths have different performance characteristics.

15. A computer program product comprising a non-transitory processor-readable storage medium having stored therein program code of one or more software programs, wherein the program code, when executed by at least one processing device comprising a processor coupled to a memory and configured to communicate over a network with a storage system, causes said at least one processing device:

to initiate a background copy process in a host device coupled to first and second storage systems to copy data from the first storage system to the second storage system, the host device being separate from the first and second storage systems;

to receive in the host device input-output processing pressure feedback information from at least one of the first and second storage systems, the input-output processing pressure feedback information comprising at least one notification sent from at least one of the first and second storage systems to the host device and indicating at least a threshold level of processing pressure resulting in at least one of the first and second storage systems at least in part from processing of input-output operations of the background copy process; and to adjust in the host device one or more characteristics of the background copy process based at least in part on the received input-output processing pressure feedback.

16. The computer program product of claim 15 wherein adjusting one or more characteristics of the background copy process based at least in part on the received input-output processing pressure feedback comprises reducing a rate of the background copy process responsive to the received input-output processing pressure feedback.

17. The computer program product of claim 15 wherein adjusting one or more characteristics of the background copy process based at least in part on the received input-output processing pressure feedback comprises throttling a rate at which input-output operations of the background copy process are sent to the first and second storage systems relative to the rates at which other input-output operations of one or more other processes executing on the host device are sent to the first and second storage systems, for at least a specified throttling period.

18. A method comprising:

initiating a background copy process in a host device coupled to first and second storage systems to copy data from the first storage system to the second storage system, the host device being separate from the first and second storage systems;

receiving in the host device input-output processing pressure feedback information from at least one of the first and second storage systems, the input-output processing pressure feedback information comprising at least one notification sent from at least one of the first and second storage systems to the host device and indicating at least a threshold level of processing pressure resulting in at least one of the first and second storage systems at least in part from processing of input-output operations of the background copy process; and adjusting in the host device one or more characteristics of the background copy process based at least in part on the received input-output processing pressure feedback;

wherein the method is performed by at least one processing device comprising a processor coupled to a memory.

19. The method of claim 18 wherein adjusting one or more characteristics of the background copy process based at least in part on the received input-output processing pressure feedback comprises reducing a rate of the background copy process responsive to the received input-output processing pressure feedback.

20. The method of claim 18 wherein adjusting one or more characteristics of the background copy process based at least in part on the received input-output processing pressure feedback comprises throttling a rate at which input-output operations of the background copy process are sent to the first and second storage systems relative to the rates at which other input-output operations of one or more other processes executing on the host device are sent to the first and second storage systems, for at least a specified throttling period.

* * * * *